United States Patent
Yu et al.

(10) Patent No.: US 12,062,765 B2
(45) Date of Patent: Aug. 13, 2024

(54) METHOD FOR EXTRACTING LITHIUM FROM WASTE LITHIUM BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/555,262

(22) PCT Filed: May 12, 2022

(86) PCT No.: PCT/CN2022/092490
§ 371 (c)(1),
(2) Date: Oct. 13, 2023

(87) PCT Pub. No.: WO2023/029573
PCT Pub. Date: Mar. 9, 2023

(65) Prior Publication Data
US 2024/0088468 A1 Mar. 14, 2024

(30) Foreign Application Priority Data

Sep. 6, 2021 (CN) .......................... 202111036546.9

(51) Int. Cl.
*H01M 10/54* (2006.01)
*C22B 3/00* (2006.01)
(Continued)

(52) U.S. Cl.
CPC .............. *H01M 10/54* (2013.01); *C22B 7/007* (2013.01); *C22B 15/0069* (2013.01);
(Continued)

(58) Field of Classification Search
CPC ...... H01M 10/54; H01M 10/052; C22B 7/007; C22B 15/0069; C22B 23/0461; C22B 26/12
(Continued)

(56) References Cited

U.S. PATENT DOCUMENTS

2021/0391606 A1* 12/2021 Wang ..................... C01G 49/02

FOREIGN PATENT DOCUMENTS

CN 102665912 A * 9/2012 .............. B01J 38/60
CN 102665912 A 9/2012
(Continued)

OTHER PUBLICATIONS

International Search Report for PCT/CN2022/092490 mailed Aug. 9, 2022, ISA/CN.
(Continued)

*Primary Examiner* — James M Erwin
*Assistant Examiner* — John S Medley
(74) *Attorney, Agent, or Firm* — Yue (Robert) Xu; Apex Attorneys at Law, LLP

(57) ABSTRACT

The present disclosure discloses a method for extracting lithium from waste lithium batteries, which comprises:
(Continued)

leaching positive electrode powder of the waste lithium battery in hydrochloric acid, and obtaining leaching solution by filtering; removing copper and iron from the leaching solution, and then introducing hydrogen sulfide gas for reaction, and performing solid-liquid separation to obtain first filter residue and first filtrate; adding potassium permanganate to the first filtrate, and performing solid-liquid separation to obtain second filter residue and second filtrate; performing spray pyrolysis on the second filtrate to obtain solid particles and tail gas, washing the solid particles with water to obtain a lotion, washing and collecting the tail gas and then mixing the tail gas with the lotion to obtain lithium salt solution. In the present disclosure, the positive electrode powder is leached with hydrochloric acid to obtain the hydrochloric acid leaching solution, and hydrogen sulfide is used to precipitate nickel and cobalt after removing the copper and iron impurities in the leaching solution in turn, and potassium permanganate is added to precipitate manganese ions to generate manganese dioxide. Spray pyrolysis converts the aluminum and magnesium in the solution into oxides and lithium salt is separated. The entire reaction process does not require organic solvent extraction and reduces the loss of lithium.

10 Claims, 1 Drawing Sheet

(51) Int. Cl.
*C22B 7/00* (2006.01)
*C22B 15/00* (2006.01)
*C22B 26/12* (2006.01)
*H01M 10/052* (2010.01)

(52) U.S. Cl.
CPC .......... *C22B 23/0461* (2013.01); *C22B 26/12* (2013.01); *H01M 10/052* (2013.01)

(58) Field of Classification Search
USPC ............................................................ 429/49
See application file for complete search history.

(56) References Cited

FOREIGN PATENT DOCUMENTS

| | | | | | |
|---|---|---|---|---|---|
| CN | 105206889 | A | * | 12/2015 | ............... C22B 7/00 |
| CN | 107046154 | A | | 8/2017 | |
| CN | 108011149 | A | | 5/2018 | |
| CN | 108193050 | A | | 6/2018 | |
| CN | 110581323 | A | * | 12/2019 | .............. C01B 25/45 |
| CN | 110714122 | A | * | 1/2020 | ......... C22B 2300/00 |
| CN | 110923453 | A | | 3/2020 | |
| CN | 111534697 | A | | 8/2020 | |
| CN | 113846219 | A | | 12/2021 | |
| WO | 2009/100602 | A1 | | 8/2009 | |
| WO | 2012025568 | A2 | | 3/2012 | |
| WO | 2018047147 | A1 | | 3/2018 | |
| WO | 2019/150403 | A1 | | 8/2019 | |

OTHER PUBLICATIONS

Search Report dated May 21, 2024 for Morocco patent application No. 62709, English translation provided by Google Translate.

* cited by examiner

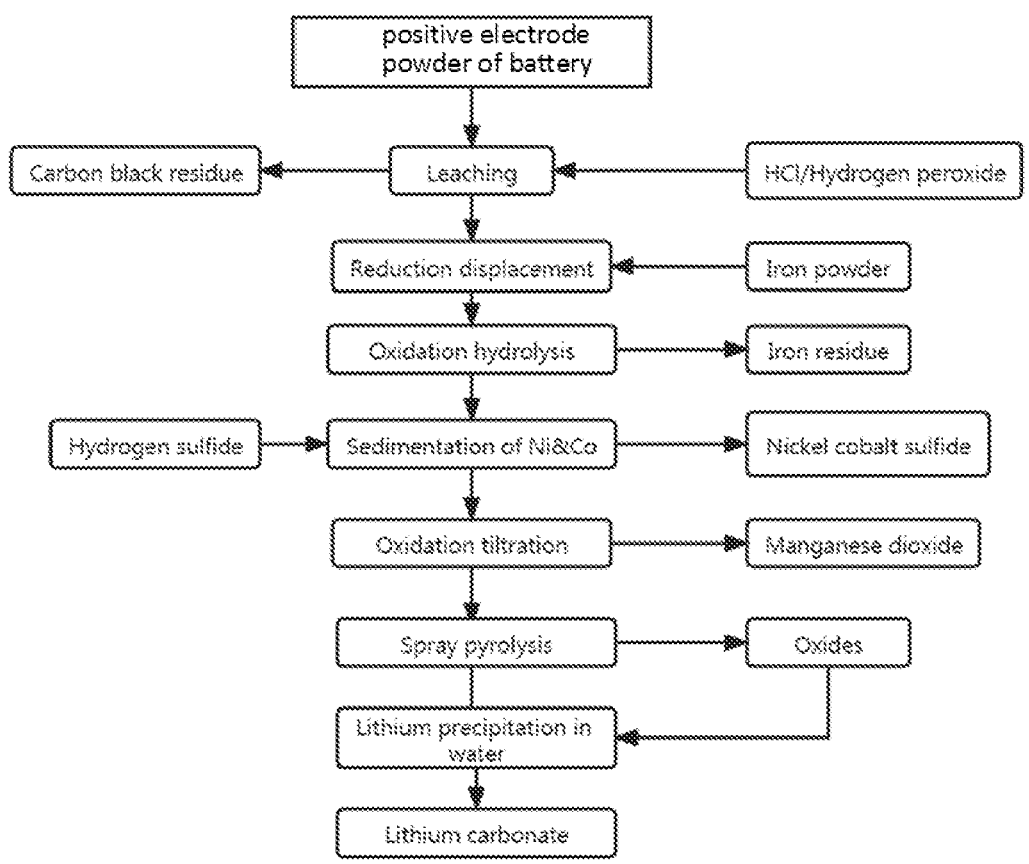

METHOD FOR EXTRACTING LITHIUM FROM WASTE LITHIUM BATTERY

CROSS-REFERENCE OF RELATED APPLICATIONS

The present application is the national phase of International Application No. PCT/CN2022/092490, titled "METHOD FOR EXTRACTING LITHIUM FROM WASTE LITHIUM BATTERY", which claims the priority of Chinese Patent Application No. 202111036546.9, filed with the China National Intellectual Property Administration on Sep. 6, 2021, and titled with "METHOD FOR EXTRACTING LITHIUM FROM WASTE LITHIUM BATTERY", and the entire disclosures thereof are incorporated herein by reference.

FIELD

The invention belongs to the technical field of waste lithium battery recovery, specifically to a method for extracting lithium from waste lithium batteries.

BACKGROUND

Due to good safety, high energy density, environmental protection and good electrochemical performance, ternary lithium-ion batteries are widely used in the fields of electronic products, mobile power supplies and new energy vehicles. However, after multiple cycles of charging and discharging, the active material in the battery will lose its activity, resulting in a decrease in the capacity of the battery and the battery being scrapped. With the widespread use of lithium-ion batteries, a large number of waste batteries will inevitably be brought about. If they are randomly discarded, it will cause serious pollution to the environment. At the same time, the positive electrode material contains a variety of precious and rare metals such as nickel, cobalt, and lithium. Among them, Ni and Co elements are high-value non-ferrous metals. The price of Ni element can reach 400,000 RMB/ton at the highest price, and the price of cobalt has also risen to 370,000 RMB/ton. It can be said that the recycling of waste lithium-ion batteries is not only green and environmentally friendly but also with huge returns. Therefore, from the perspective of environmental protection and resource recycling, it is very important to choose an appropriate method to dispose waste batteries.

At present, a lot of research has been done on the recovery of valuable metals in waste lithium-ion batteries. A traditional recycling method is to adopt an acid leaching process. First, the waste lithium-ion battery needs to be disassembled to obtain positive electrode powder, and then the valuable metal is leaching with strong acid. The metal is treated with an oxidizing agent such as $H_2O_2$, and a reducing agent $Na_2SO_3$. After the solution is purified, pure nickel, cobalt and manganese salt solutions are obtained by process of solution extraction. Finally, metal is recovered through elemental separation, or a certain amount of nickel sulfate, cobalt sulfate and manganese sulfate solutions are added in proportion to form stock of the precursor of the regenerated positive electrode material. Although the method is simple in process, the efficiency is very low, and a large amount of waste water would be generated, which causes pollution to the environment, and also has the problem of low Li recovery rate. On the other hand, there is a high requirement for impurity content of battery materials. Waste lithium-ion batteries contain iron, aluminum, copper, magnesium and other elements, and the leaching solution needs to be purified during the process of recycling valuable metals in the battery. At present, the method of separating and recovering metals sequentially is mostly used, which takes a long process and high cost, and the extractant even has the ability to extract lithium, thereby reducing the recovery rate of lithium. If the leaching solution is directly used as the precursor of the positive electrode material, the recovery of lithium would not be taken into consideration. Therefore, under the premise of ensuring complete recovery of nickel, cobalt, and manganese, it is necessary to increase the recovery rate of lithium at the same time.

SUMMARY

The present invention aims to solve at least one of the technical problems existing in the above-mentioned prior art. For this reason, the present invention proposes a method for extracting lithium from waste lithium batteries.

According to one aspect of the present invention, a method for extracting lithium from waste lithium batteries is proposed, which comprises the following steps:
S1: leaching positive electrode powder of the waste lithium batteries in hydrochloric acid, and obtaining leaching solution by filtering;
S2: removing copper and iron from the leaching solution, and then introducing hydrogen sulfide gas for reaction, and performing solid-liquid separation to obtain first filter residue and first filtrate;
S3: adding potassium permanganate to the first filtrate, and performing solid-liquid separation to obtain second filter residue and second filtrate;
S4: performing spray pyrolysis on the second filtrate to obtain solid particles and tail gas, washing the solid particles with water to obtain a solution, washing and collecting the tail gas and then mixing the tail gas with the solution to obtain lithium salt solution.

In some embodiments of the present invention, in step S1, concentration of the hydrochloric acid is 1.0-6.0 mol/L, and solid-liquid ratio of the positive electrode powder to the hydrochloric acid is 100-250 g/L.

In some embodiments of the present invention, in step S1, hydrogen peroxide is also added to participate in leaching. Hydrogen peroxide can improve leaching rate.

In some embodiments of the present invention, in step S2, the process of removing copper and iron is: adding iron powder to the leaching solution to perform a displacement reaction, adding an oxidizing agent and adjusting pH to 3.5-4.0 after the reaction is completed, performing solid-liquid separation to remove copper and iron residue.

In some preferred embodiments of the present invention, in step S2, molar ratio of the amount of iron powder added to content of copper ion in the leaching solution is (1.0-1.1):1.

In some preferred embodiments of the present invention, in step S2, calcium carbonate is used to adjust pH. Calcium carbonate is cheap, and it can also remove fluoride ion and phosphate ion while adjusting pH.

In some preferred embodiments of the present invention, in step S2, the oxidizing agent is one or more of chlorine gas, hydrogen peroxide or nitric acid.

In some embodiments of the present invention, in step S2, pressure of the hydrogen sulfide is 200-300 kPa; preferably, the reaction temperature of hydrogen sulfide gas introduced is 65-125° C.

In some embodiments of the present invention, in step S2, the first filter residue is nickel cobalt sulfide precipitate, and the nickel cobalt sulfide precipitate is dissolved in sulfuric acid to obtain nickel sulfate and cobalt sulfate solution, which can be used as precursor solution.

In some embodiments of the present invention, in step S3, the potassium permanganate is added by titration until no more precipitation occurs.

In some embodiments of the present invention, in step S4, spray pyrolysis temperature is 600-1350° C., and carrier gas pressure is 0.1-0.3 MPa.

In some embodiments of the present invention, in step S4, adding carbonate to the lithium salt solution for reaction to obtain lithium carbonate precipitate; preferably, the temperature of the reaction is 80-95° C. Lithium carbonate is used as a lithium source for the positive electrode material. Further, the lithium carbonate precipitation is also refined and purified.

According to a preferred embodiment of the present invention, it has at least the following beneficial effects:

1. In the present invention, positive electrode powder of the waste battery is leached with hydrochloric acid to obtain the hydrochloric acid leaching solution. After removing copper and iron impurities in the leaching solution in turn, hydrogen sulfide is used to precipitate nickel and cobalt, and potassium permanganate is added to precipitate manganese ions to generate manganese dioxide. Finally, the aluminum and magnesium in the solution are converted into oxides through spray pyrolysis, and the lithium salt is separated. The whole reaction process does not require organic solvent extraction, which reduces the loss of lithium. In order to ensure the smooth progress of subsequent spray pyrolysis, the present invention uses hydrochloric acid to leach the positive electrode powder. Since the leaching solution contains magnesium and aluminum, ordinary organic extractants cannot perform separation, hydrogen sulfide is used to precipitate nickel and cobalt, and potassium permanganate is used to oxidize manganese ions to obtain manganese dioxide, and spray pyrolysis is finally used. The volatile characteristics of hydrogen chloride and lithium chloride are utilized, and aluminum chloride and magnesium chloride are thermally decomposed into oxides and separated.

2. The present invention has a short process and low production cost, the extraction process of the organic solvent is omitted, the loss of lithium is avoided, and the yield of lithium in the leaching solution is improved.

BRIEF DESCRIPTION OF DRAWINGS

The present invention will be further described below with reference to the accompanying drawings and examples, in which:

FIG. 1 is a process flow diagram of Example 1 of the present invention.

DETAILED DESCRIPTION

Hereinafter, the concept and technical effects of the disclosure will be clearly and completely described below in combination with the examples of the present disclosure, so as to fully understand the purpose, characteristics and effects of the disclosure. Apparently, the described examples are only some examples of the present invention, rather than all of the examples. Based on the examples of the present disclosure, other examples obtained by those skilled in the art on the premise of paying no creative work belong to the protection scope of the present disclosure.

Example 1

A method for extracting lithium from waste lithium batteries, referring to FIG. 1, the specific process was:

(1) Leaching: 100 g of waste lithium battery positive electrode powder was put into 1 L of hydrochloric acid with a concentration of 6.0 mol/L, and 100 ml of hydrogen peroxide was added to leach for 5 h; after the reaction was completed, it was filtered to obtain leaching solution and carbon black residue;

Detection of Leaching Solution:

| composition | Li | Ni | Co | Mn | Cu | Al | Fe |
|---|---|---|---|---|---|---|---|
| mass fraction(g) | 6.01 | 36.06 | 14.38 | 19.02 | 0.69 | 1.52 | 0.61 |

(2) Reduction replacement: iron powder was added to the leaching solution obtained in step (1), the molar ratio of the amount of iron powder added to the content of copper ion in the leaching solution was 1.1:1;

(3) Oxidative hydrolysis: after the reaction of step (2) was completed, chlorine gas was added and calcium carbonate was added to adjust pH to 3.5-4.0, and copper iron residue and filtrate were obtained after solid-liquid separation;

(4) Nickel and cobalt sedimentation: at a temperature of 65-70° C., hydrogen sulfide gas was introduced at a pressure of 200 kPa into the filtrate obtained in step (3) until the nickel and cobalt were precipitated completely, and nickel and cobalt sulfide precipitate and lithium-rich filtrate were respectively prepared after solid-liquid separation;

(5) Oxidation titration: potassium permanganate was added to the lithium-rich filtrate obtained in step (4) by titration until precipitation no longer occurred (that was, the solution no longer became colorless after stirring), and the manganese dioxide precipitate was separated;

(6) Spray pyrolysis: the remaining filtrate of step (5) was subjected to spray pyrolysis, the spray pyrolysis temperature was controlled to 600-700° C., and the carrier gas pressure to 0.1 MPa to obtain oxide solid particles;

(7) Lithium precipitation in water: the oxide produced by spray pyrolysis in step (6) was washed with water to obtain a solution, and the tail gas generated by spray pyrolysis was subjected to water rinsing and collected and mixed with the solution to prepare lithium salt solution;

(8) At a temperature of 80-95° C., carbonate was added to the lithium salt solution, and the precipitate obtained by separation was lithium carbonate. After refinement and purification of lithium carbonate, pure lithium carbonate could be obtained.

The refined lithium carbonate was weighed to be 31.50 g, and the yield of lithium was calculated to be 98.47%.

Example 2

A method for extracting lithium from waste lithium batteries, the specific process was:

(1) Leaching: 100 g of waste lithium battery positive electrode powder was put into 0.5 L of hydrochloric acid with a concentration of 3.0 mol/L, and 800 ml of hydrogen peroxide was added to leach for 6 h; after the reaction was completed, it was filtered to obtain leaching solution and carbon black residue;

Detection of Leaching Liquid:

| Composition | Li | Ni | Co | Mn | Cu | Al | Fe |
|---|---|---|---|---|---|---|---|
| Mass fraction(g) | 6.11 | 35.23 | 14.21 | 18.97 | 0.71 | 1.49 | 0.64 |

(2) Reduction replacement: iron powder was added to the leaching solution obtained in step (1), the molar ratio of the amount of iron powder added to the content of copper ion in the leaching solution was 1.05:1;

(3) Oxidative hydrolysis: after the reaction of step (2) was completed, chlorine gas was added and calcium carbonate was added to adjust pH to 3.5-4.0, and copper iron residue and filtrate were obtained after solid-liquid separation;

(4) Nickel and cobalt sedimentation: at a temperature of 80-90° C., hydrogen sulfide gas was introduced at a pressure of 300 kPa into the filtrate obtained in step (3) until the nickel and cobalt were precipitated completely, and nickel and cobalt sulfide precipitate and lithium-rich filtrate were respectively prepared after solid-liquid separation;

(5) Oxidation titration: potassium permanganate was added to the lithium-rich filtrate obtained in step (4) by titration until precipitation no longer occurred (that was, the solution no longer became colorless after stirring), and the manganese dioxide precipitate was separated;

(6) Spray pyrolysis: the remaining filtrate of step (5) was subjected to spray pyrolysis, the spray pyrolysis temperature was controlled to 800-900° C., and the carrier gas pressure to 0.2 MPa to obtain oxide solid particles;

(7) Lithium precipitation in water: the oxide produced by spray pyrolysis in step (6) was washed with water to obtain a solution, and the tail gas generated by spray pyrolysis was subjected to water rinsing and collected and mixed with the solution to prepare lithium salt solution;

(8) At a temperature of 80-95° C., carbonate was added to the lithium salt solution, and the precipitate obtained by separation was lithium carbonate. After refinement and purification of lithium carbonate, pure lithium carbonate could be obtained.

The refined lithium carbonate was weighed to be 31.93 g, and the yield of lithium was calculated to be 98.18%.

Example 3

A method for extracting lithium from waste lithium batteries, the specific process was:

(1) Leaching: 100 g of waste lithium battery positive electrode powder was put into 0.8 L of hydrochloric acid with a concentration of 1.0 mol/L, and 120 ml of hydrogen peroxide was added to leach for 5 h; after the reaction was completed, filtered to obtain leaching solution and carbon black residue;

Detection of Leaching Liquid:

| Composition | Li | Ni | Co | Mn | Cu | Al | Fe |
|---|---|---|---|---|---|---|---|
| Mass fraction(g) | 6.09 | 35.65 | 14.30 | 19.00 | 0.63 | 1.47 | 0.53 |

(2) Reduction replacement: iron powder was added to the leaching solution obtained in step (1), the molar ratio of the amount of iron powder added to the content of copper ions in the leaching solution was 1.1:1;

(3) Oxidative hydrolysis: after the reaction of step (2) was completed, nitric acid was added and calcium carbonate was added to adjust pH to 3.5-4.0, and copper iron residue and filtrate were obtained after solid-liquid separation;

(4) Nickel and cobalt sedimentation: at a temperature of 85-95° C., hydrogen sulfide gas was introduced at a pressure of 250 kPa into the filtrate obtained in step (3) until the nickel and cobalt were precipitated completely, and nickel and cobalt sulfide precipitate and lithium-rich filtrate were respectively prepared after solid-liquid separation;

(5) Oxidation titration: potassium permanganate was added to the lithium-rich filtrate obtained in step (4) by titration until precipitation no longer occurred (that was, the solution no longer became colorless after stirring), and the manganese dioxide precipitate was separated;

(6) Spray pyrolysis: the remaining filtrate of step (5) was subjected to spray pyrolysis; the spray pyrolysis temperature was controlled to 950-1350° C., and the carrier gas pressure to 0.1 MPa to obtain oxide solid particles;

(7) Lithium precipitation in water: the oxide produced by spray pyrolysis in step (6) was washed with water to obtain a lotion, and the tail gas generated by spray pyrolysis was subjected to water rinsing and collected and mixed with the lotion to prepare lithium salt solution;

(8) At a temperature of 80-95° C., carbonate was added to the lithium salt solution, and the precipitate obtained by separation was lithium carbonate. After refinement and purification of lithium carbonate, pure lithium carbonate can be obtained.

The refined lithium carbonate was weighed to be 31.61 g, and the yield of lithium was calculated to be 97.52%.

The examples of the present disclosure are described in detail above with reference to the accompanying drawings, but the present disclosure is not limited to the described examples. Within the scope of knowledge possessed by the ordinary skilled person in the art, various modifications can be made without departing from the purpose of the present invention. In addition, in the case of no conflict, the examples of the present invention and the features in the examples can be combined with each other.

The invention claimed is:

1. A method for extracting lithium from waste lithium batteries, comprising the following steps:
S1: leaching a positive electrode powder of the waste lithium batteries in hydrochloric acid, and obtaining a leaching solution by filtering;
S2: removing copper and iron from the leaching solution, and then introducing hydrogen sulfide gas for reaction, and performing solid-liquid separation to obtain a first filter residue and a first filtrate;
S3: adding potassium permanganate to the first filtrate, and performing solid-liquid separation to obtain a second filter residue and a second filtrate;
S4: performing spray pyrolysis on the second filtrate to obtain solid particles and tail gas, washing the solid particles with water to obtain a solution, washing and collecting the tail gas and then mixing the tail gas with the solution to obtain lithium salt solution.

2. The method according to claim 1, wherein in step S1, a concentration of the hydrochloric acid is 1.0-6.0 mol/L, and a solid-liquid ratio of the positive electrode powder to the hydrochloric acid is 100-250 g/L.

3. The method according to claim 1, wherein in step S2, a process of removing copper and iron is: adding iron powder to the leaching solution to perform a displacement reaction, adding an oxidizing agent and adjusting pH to 3.5-4.0 after the displacement reaction is completed, performing a solid-liquid separation to remove copper and iron residue.

4. The method according to claim 3, wherein in step S2, a molar ratio of an amount of iron powder added to a content of copper ion in the leaching solution is (1.0-1.1):1.

5. The method according to claim 3, wherein in step S2, calcium carbonate is used to adjust pH.

6. The method according to claim 1, wherein in step S2, a pressure of the hydrogen sulfide is 200-300 kPa; preferably, a reaction temperature of hydrogen sulfide gas introduced is 65-125° C.

7. The method according to claim 1, wherein in step S2, the first filter residue is nickel cobalt sulfide precipitate, and the nickel cobalt sulfide precipitate is dissolved in sulfuric acid to obtain a nickel sulfate and cobalt sulfate solution.

8. The method according to claim 1, wherein in step S3, the potassium permanganate is added by titration until no more precipitation occurs.

9. The method according to claim 1, wherein in step S4, a spray pyrolysis temperature is 600-1350° C., and a carrier gas pressure is 0.1-0.3 MPa.

10. The method according to claim 1, wherein in step S4, carbonate is added to the lithium salt solution for reaction to obtain lithium carbonate precipitate.

\* \* \* \* \*